United States Patent [19]

Suzui et al.

[11] 3,975,349

[45] Aug. 17, 1976

[54] PROCESS FOR PREPARING DIALLYL PHTHALATE LATEX

[75] Inventors: Akio Suzui, Amagasaki; Hiroshi Yoshimoto, Ibaraki; Takeshi Kuri, Kobe, all of Japan

[73] Assignee: Osaka Soda Co., Ltd., Osaka, Japan

[22] Filed: Jan. 13, 1975

[21] Appl. No.: 540,441

[30] Foreign Application Priority Data

Sept. 6, 1974 Japan.............................. 49-103208

[52] U.S. Cl...................... 260/29.7 R; 260/29.7 P; 260/29.7 SQ
[51] Int. Cl.²......................................... C08L 45/00
[58] Field of Search.................. 260/29.7 R, 29.7 P, 260/29.7 SQ

[56] References Cited

UNITED STATES PATENTS 2,853,471  9/1958  Beadell.......................... 260/29.7 P

FOREIGN PATENTS OR APPLICATIONS

| 2,120,137 | 11/1972 | Germany |
| 1,131,016 | 6/1962 | Germany |
| 431,994 | 9/1967 | Switzerland |
| 86,817 | 4/1958 | United Kingdom |
| 821,093 | 9/1959 | United Kingdom |

Primary Examiner—M. J. Welsh
Attorney, Agent, or Firm—Sherman & Shalloway

[57] ABSTRACT

A process for preparing a diallyl phthalate latex which comprises using in proportions of a total of 30 – 100 weight parts of monomer and a total of 0.3 – 10.0 weight parts of an anionic surfactant to a total of 100 weight parts of water, and I. carrying out the emulsion polymerization of the following emulsion polymerization system, i.e., an emulsion polymerization system comprising
  a. water in an amount of 50 – 70 weight % of the total amount thereof,
  b. monomer in an amount of 10 – 20 weight % of the total amount thereof, said monomer being selected from the group consisting of a diallyl phthalate monomer and a diallyl phthalate-containing monomeric mixture
  c. said surfactant in an amount of 10 – 20 weight % of total amount thereof, and
  d. a radical catalyst in toto; and, then II. at a period after the degree of polymerization has reached 50 weight % and before completion of the polymerization, furthering the emulsion polymerization reaction while slowly adding an additional emulsion polymerization system containing the following components but not containing said radical catalyst:
  a. water remaining of the total amount thereof
  b. monomer remaining of the total amount thereof, and
  c. said surfactant remaining of the total amount thereof.

7 Claims, No Drawings

PROCESS FOR PREPARING DIALLYL PHTHALATE LATEX

This invention relates to a process for preparing a diallyl phthalate latex possessing such various excellent stabilities as mechanical, chemical and stability to freezing as well as stability when left standing and stability when mixed with other resins, by which process the diallyl phthalate latex can be prepared with superior polymerization stability without involving the objectionable formation of coagulum and with good quality reproducibility.

More particularly, the invention relates to a process for preparing a diallyl phthalate latex which comprises using in proportions of a total of 30 – 100 weight parts of monomer and a total of 0.3 – 10.0 weight parts of a anionic surfactant to a total of 100 weight parts of water, and I. carrying out the emulsion polymerization of the following emulsion polymerization system, i.e., an emulsion polymerization system containing a. water in an amount of 50 – 70 weight % of the total amount thereof, b. monomer in an amount of 10 – 20 weight % of the total amount thereof, said monomer being selected from the group consisting of a diallyl phthalate monomer and a diallyl phthalate-containing monomeric mixture wherein an alkyl acrylate and/or an alkyl methacrylate are contained in a ratio to diallyl phthalate of not more than 3:1, and in which up to a half (weight) of said alkyl acrylate and/or alkyl methacrylate may be substituted by other vinyl monomers copolymerizable therewith.

c. said surfactant in an amount of 10 – 20 weight % of the total amount thereof, and d. a radical catalyst in toto; and II. at a period after the rate of polymerization has reached 50 weight % and before completion of the polymerization, furthering the emulsion polymerization reaction while slowly adding an additional emulsion polymerization system containing the following components but not containing said radical catalyst:

a'. water remaining of the total amount thereof, b'. monomer remaining of the total amount thereof, and c'. said surfactant remaining of the total amount thereof.

The aqueous emulsion polymerization of 100 – 1% of an allyl ester with 0 – 99% of a vinyl monomer in the presence of a radical catalyst is known (British Pat. No. 821,093). In this patent there is suggested that in addition to the aqueous emulsion polymerization by the monomer addition method there is also usable the emulsion addition method. According to this patent, this latter emulsion addition method is carried out by first polymerizing an emulsion polymerization system consisting of at least 95% of water and an emulsion stabilizer, an accelerator, a reducing agent, a pH adjusting agent and a buffer agent, and a part of a monomer and a catalyst and subsequently adding dropwise the remaining catalyst and monomer, as such, or in the form of an emulsion.

It is well known that in the case of emulsion polymerization the various factors such as the classes and amounts used of the emulsifier and the surfactant used as the emulsion stabilizer, the class of the emulsion polymerization method, the class and amount used of the monomer, and the combining conditions of the monomer have, in general, complicated effects on the stabilities of the polymerization system and the latex system formed and the smoothness of the polymerization reaction, as well as the size and distribution of the resinous particles formed.

We have been engaged for several years in researches concerning the allyl esters, and particularly diallyl phthalate, but have found it extremely difficult to develop a process for preparing with excellent polymerization stability and good quality reproducibility a diallyl phthalate latex having superior stability. We have however noted that of the various polymerization methods such as the one-time charging method, the monomer addition method and the emulsion addition method, the control of the heat of polymerization was the simplest in the case of the emulsion addition method. Hence, in resolving the foregoing difficulties involved in the preparation of a diallyl phthalate latex we decided on the adoption of this method and furthered our researches along this line.

As a consequence of these researches, we found that the use of the conventional anionic and nonionic surfactants or the mixture of an anionic and a nonionic surfactants frequently resulted in the formation of flocculus matter or, in extreme cases, the coagulation of the entire polymerization system and, hence, since the stability of the polymerization reaction was extremely poor, it was impossible to prepare a diallyl phthalate latex with good reproducibility. It was further found that the use of a anionic surfactant which is derived from a nonionic surfactant was effective in surmounting the aforementioned drawbacks. Again, it was found that when the emulsion to be added after the initiation of the polymerization reaction, and containing the remaining monomer, also contains the catalyst, as in the case of the aforementioned conventional proposal, not only the quality reproducibility of the resulting diallyl phthalate latex was poor, but also the stability of the polymerization reaction as well as the stability of the resulting latex was not satisfactory. In addition, it was found that restrictions were imposed as to the proportions in which the water, the diallyl phthalate monomers and the nonionic anion surfactant were used, as well as the amounts used of the water, monomer and surfactant in the emulsion polymerization system to be formed first and the amounts used of these components in the additional emulsion polymerization system to be added after the initiation of the polymerization reaction. For instance, it was found that the stability of the polymerization reaction and the stability of the resulting diallyl phthalate latex would be aggravated, if water in an amount in excess of 95% of the total water to be used was added to the first emulsion polymerization system. As a result of further researches, we found that desirable results could be had from the standpoint of the stability of the polymerization reaction and quality reproducibility by slowly adding the additional emulsion polymerization system not containing the radical catalyst at a period during the polymerization reaction subsequent to where the rate of polymerization of the first emulsion polymerization system has reached 50 weight %.

It was thus found that a diallyl phthalate latex possessing the various excellent stabilities as mechanical, chemical and stability to freezing as well as stability when left standing and stability when mixed with other resins could be prepared with good quality reproducibility and without involving the objectionable formation of coagulum, this being accomplished by using all of the aforementioned water, monomers and anion surfactant with the proviso that the polymerization reaction is carried out using an emulsion polymerization system satisfying the aforementioned requisites (I) followed by slowly adding at a point subsequent to where the rate of polymerization of said system has reached 50 weight % and before completion of the polymerization reaction an additional emulsion polymerization system satisfying the aforementioned requisites (II) and not containing the radical catalyst.

It is therefore an object of the present invention to provide a process by which a diallyl phthalate latex of superior stability can be prepared with good quality reproducibility and excellent stability of the polymerization reaction.

Other objects and advantages of the present invention will become apparent from the following description.

In the invention process the monomer and the anionic surfactant are used in proportions of a total of 30 – 100 weight parts and a total of 0.3 – 10.0 weight parts, respectively, to a total of 100 weight parts of the water. When the total amount of monomer is less than the foregoing range, the stability of the polymerization reaction is satisfactory, but since the content of resin is small, this is not practical. On the other hand, when the amount of monomer exceeds the foregoing range, there is the objection that the stability of the polymerization reaction becomes poor to result in the precipitation of floccules to make the product unfit for use. On the other hand, when the total amount of the anion surfactant is smaller than that indicated hereinabove, the stability of the polymerization reaction as well as the stability of the resulting latex and quality reproducibility suffer.

The foregoing anionic surfactants are exemplified by such as the $NH_4$, Na and K salts of either the sulfuric or phosphoric acid esters of nonionic surfactants selected from polyoxyethylene alkylphenyl ethers, polyoxyethylene alkyl ethers and polyoxyethylene polyoxypropylene ethers, such as polyoxyethylene nonyl phenyl ether ammonium sulfate, polyoxyethylene nonyl phenyl ether sodium phosphate or bis(polyoxyethylene nonyl phenyl ether) potassium phosphate.

On the other hand, the monomer used in this invention is of the diallyl phthalate type selected from the group consisting of monomeric diallyl phthalate and diallyl phthalate-containing monomeric mixtures in which an alkyl acrylate and/or alkyl methacrylate are contained in a ratio to diallyl phthalate monomer of not more than 3:1, with the proviso that up to a half (weight) of the alkyl acrylate and/or alkyl methacrylate may be substituted by other vinyl monomers copolymerizable therewith.

As these diallyl phthalates, mention can be made of the diallyl esters of phthalic, isophthalic and terephthalic acids. On the other hand, as the aforementioned alkyl acrylates, there can be conveniently named such $C_1 - C_8$ alkyl esters of acrylic acid as, for example, methyl acrylate, ethyl acrylate, n- or isopropyl acrylate, n-, iso-, sec- or tert-butyl acrylate, 2-ethylhexyl acrylate and n-octyl acrylate. As examples of the aforementioned alkyl methacrylate, conveniently usable are the $C_1 - C_8$ alkyl esters of methacrylic acid such, for example, as the alkyl ester, such as above illustrated, of methacrylic acid. Further, as examples of the aforementioned other vinyl monomer that can be utilized instead of the foregoing alkyl acrylate and/or alkyl methacrylate in an amount up to a half (weight) thereof, there can be mentioned such vinyl monomers as styrene, vinyltoluene, acrylonitrile, vinyl acetate and vinyl propionate.

In this invention an emulsion polymerization system containing the following components (a), (b), (c) and (d) is first polymerized.
a. Water in an amount of 50 – 70 weight % of the total amount thereof.
b. Diallyl phthalate monomer or monomers such as indicated above, in an amount of 10 – 20 weight % of the total amount thereof.
c. A surfactant in an amount of 10–20 weight % of the total amount thereof, and
d. A radical catalyst in toto.

If the amount of water is an insufficient amount of less than 50 weight %, difficulty is experienced in controlling the heat of polymerization during the initial stages of the polymerization reaction, with the consequence that the stability of the polymerization reaction as well as the stability of the resulting diallyl phthalate latex suffers. On the other hand, when the amount of water is so large as to exceed 70 weight %, the amount of water to be used for the preparation of the subsequently added monomer emulsion becomes insufficient to likewise result in the aggravation of the stability of the polymerization reaction as well as the stability of the resulting diallyl phthalate latex. On the other hand, when the amount of monomer is so small that it is less than 10 weight %, the particle distribution of the size of the resinous particles formed becomes excessively broad to result in the deterioration of the stability of the resulting latex and quality reproducibility, whereas if the amount of the monomer is so large as to exceed 20 weight %, the stability of the polymerization reaction worsens, and the stability of the resulting latex and quality reproducibility are also aggravated. Again, when the amount of the nonionic anion surfactant is so small that it is less than 10 weight %, the particle size distribution becomes too broad, and the physical properties of the resulting diallyl phthalate latex suffer. On the other hand, when the amount of the foregoing surfactant exceeds 20 weight %, the particle size distribution becomes excessively narrow, and the stability of the diallyl phthalate latex becomes unsatisfactory.

An emulsion polymerization system, such as above described, is polymerized in the process of this invention. The radical catalyst used in the polymerization reaction is preferably a water-soluble radical catalyst such, for example, as ammonium persulfate, sodium persulfate, potassium persulfate and hydrogen peroxide. While the catalyst can be used in an optional amount, preferred is an amount ranging from about 0.05 to about 5 weight %, and more preferably from about 0.25 to about 2.5 weight %.

The polymerization reaction can be carried out under atmospheric conditions, but, if desired, superatmospheric conditions can also be employed. Again, while the reaction can be carried out even at room temperature, it is preferred that it be carried out by the application of heat. For example, a temperature ranging from room temperature to the reflux temperature of the polymerization system can be employed. When the reaction is to be carried out under superatmospheric conditions, it is possible to employ higher temperatures. When the reaction is carried out under heating, a temperature ranging from about 70°C to about 90°C. is preferably used. While a polymerization time of usually about 1 – 10 hours will suffice, preferred is a time of about 2 – 5 hours.

Thus, as hereinbefore described, in this invention an emulsion polymerization system satisfying the aforementioned requisites (I) is polymerized, and at a point subsequent to where the polymerization reaction has reached a rate of polymerization of 50 weight % but before completion of the polymerization, and preferably at a point up to where 80 weight % of the desired final polymerization rate has been reached, an additional emulsion polymerization system containing the following components (a'), b') and (c')but not containing the aforesaid radical catalyst is slowly added to further the emulsion polymerization reaction to its completion.

(a') Water remaining of the total amount thereof,
(b') Monomer remaining of the total amount thereof, and
(c') Surfactant remaining of the total amount thereof.

The addition of the foregoing additional emulsion polymerization system is carried out slowly under the polymerization reaction conditions. For instance, it can be added dropwise or it can be divided into a number of small portions and added at spaced intervals or it can be added continuously in small amounts. While the period of time over which the addition is made will vary depending upon the total amount of this remaining portion to be added, it usually ranges from about 30 minutes to about 5 hours, and preferably from about 1 to 2 hours.

In the invention process it is best to initiate the polymerization of the emulsion polymerization system satisfying the aforesaid requisites (I) and, at a point subsequent to where the rate of polymerization has reached 50 weight %, to commence and proceed with the addition of the additional emulsion polymerization system satisfying the requisites (II) while continuing the emulsion reaction to completion. If the addition of the latter system is commenced immediately subsequent to the initiation of the polymerization reaction, there is the objection that the control of the heat of polymerization becomes difficult and, in addition, not only the stability of the polymerization reaction becomes poor but also the particle size distribution becomes too broad, with the consequence that the physical properties of the resulting diallyl phthalate latex suffer. The rate of polymerization, as used herein, was measured in the following manner.

Rate of polymerization.

About one gram of the latex specimen is accurately weighted out. Thirty milliliters of methanol is added thereto and mixed with thorough shaking. A few drops of a 5% aqueous alum solution is then added to coagulate the polymer. The system is then placed in a centrifugal sedimentation vessel, and the polymer is precipitated by operating the machine for 5 minutes at 2000 rpm, after which the supernatant liquid is removed by decantation. The precipitate is then dried by heating for 3 hours at 110°C. and weighed (A grams). The rate of polymerization is then calculated as follows:

$$\text{Rate of polymerization (wt. \%)} = \frac{A \text{ grams}}{B \text{ grams}} \times 100$$

where B is the weight of the charged monomer contained in the latex specimen weighed out.

In this invention, the rate of polymerization of the resinous components contained in the latex at the time of the completion of the polymerization can be suitably chosen in accordance with the purpose for which it is used. The rate of polymerization is preferably chosen from that ranging from about 50 weight % to 100 weight %. In the case where other monomers of the aforesaid (b) has been used in this invention, the rate of polymerization of the resinous components contained in the latex can also be suitably chosen in accordance with the proportion in which the diallyl phthalate and these comonomers have been used. For example, when the content of diallyl phthalate in the monomeric mixture is at its maximum, a rate ranging from about 50 weight % to about 80 weight % is chosen, whereas when the diallyl phthalate content is at its minimum, a rate of from about 70 weight % to about 100 weight % is chosen, i.e., it is best to choose a higher rate of polymerization in proportion as the content of the other monomers is increased. For instance, in the case of a monomeric mixture consisting of 50 weight % of diallyl phthalate and 50 weight % of butyl acrylate, a rate of polymerization from about 80 weight % to about 100 weight % is preferably chosen. The polymerization can be terminated at the desired rate of polymerization by cooling the emulsion polymerization system to room temperature or below and/or by the addition to the system of a polymerization inhibitor.

For example, an emulsion of a low rate of polymerization of about 20 – about 30 weight % is a latex containing a diallyl phthalate monomer and a diallyl phthalte prepolymer dissolved in said monomer, and while it excels in film formability, its film abounds in tackiness. When this tacky film is heated in the presence of a curing catalyst such as benzoyl peroxide, tert-butyl perbenzoate and tert-butyl perpivalate, it becomes a hard film. Hence, when the foregoing latex of low rate of polymerization is incorporated with a curing catalyst, such as mentioned above, followed by impregnating it into various substrates and then heat-molded, it can be made into a shaped article. On the other hand, an emulsion of a medium rate of polymerization of about 50 – about 70 weight % is a latex containing a diallyl phthalate monomer, a diallyl phthalate prepolymer dissolved in said monomer and a gelled diallyl phthalate polymer rendered into a swollen state by said monomer, and while its film formability is poor, it can be made into a shaped article by the hot-pressing molding method. Hence, the foregoing latex of medium rate of polymerization can be made into a shaped article by incorporating it, if desired, with a curing catalyst, such as mentioned above, followed by impregnating it into the various substrates and then molding it by hot-pressing. On the other hand, an emulsion of a high rate of polymerization of, say, from about 90 weight % to about 100 weight % is a latex containing principally a gelled diallyl phthalate polymer and some diallyl phthalate monomer. This latex has little, if any, film formability or moldability by hot-pressing but is useful as a filler and, hence, can be used as a filler for, say, the water glass type inorganic coating materials.

The foregoing diallyl phthalate latex of medium rate of polymerization, whose film formability is poor, can be made to possess film formability by blending it with a vinyl type resinous latex and can be used as a composition by which the physical properties such, for example, as surface gloss, adhesiveness and, especially, heat resistance of said vinyl type resin are improved. Hence, this latex is useful as a modifier of, say, the thermosetting vinyl type resinous latices. There is the advantage that the film formability and pliability of the vinyl type resinous latices are not sacrificed in this case. Again, the foregoing diallyl phthalate latex of low rate of polymerization, when used with a curing catalyst, can also be utilized as a modifier of the vinyl type resinous latices.

Some of the diallyl phthalate latices of the present invention, as hereinabove indicated, are useful as modifiers of the vinyl type resinous latices. The vinyl type resinous latices used in this case may be either the thermoplastic vinyl resin latices or the thermosetting vinyl resin latices. The thermoplastic vinyl resin latices can be obtained in customary manner by the emulsion polymerization in an aqueous medium of a vinyl type monomer using a catalyst such as ammonium persulfate or potassium persulfate. Now, if in this case a co-polymerization reaction is carried out in customary manner while conjointly using a monomer having a thermosetting functional group as the vinyl type monomer, a thermosetting vinyl resin latex can be obtained. Since the method of preparing these latices are per se well known, a description thereof will be omitted. Examples of the foregoing vinyl type monomers are also well known. Mention can be made of such, for example, as the $C_1 - C_8$ alkyl esters of alpha, beta- unsaturated carboxylic acids such as the methyl, ethyl, butyl, 2-ethylhexyl and octyl esters of acrylic and methacrylic acids; the vinyl esters such as vinyl acetate, vinyl propionate and vinyl versatate; the aromatic vinyl compounds such as styrene and vinyltoluene; and the alpha, beta-unsaturated nitriles such as acrylonitrile and methacrylonitrile.

On the other hand, the vinyl type monomers containing a thermosetting functional group include, for example, the vinyl monomers containing the glycidyl group such as glycidyl acrylate, glycidyl methacrylate and allylglycidyl ether; the vinyl monomers containing the N-methylol or N-alkoxymethyl group such as N-methylolacrylamide, N-methylolmethacrylamide, N-methoxymethylacrylamide and N-butoxy methylacrylamide; the vinyl monomers containing the carboxyl group such as acrylic acid, methacrylic acid, crotonic acid, itaconic acid, maleic acid, fumaric acid, itaconic acid half ester and maleic acid half ester; the vinyl monomers containing the hydroxyl group such as 2-hydroxymethyl acrylate and 2-hydroxyethyl methacrylate; the vinyl monomers containing the amino group such as dimethylaminoethyl methacrylate and vinylpyridine; and the vinyl monomers containing the amido group such as acrylamide, methacrylamide and maleinamide.

The functional groups such as glycidyl, N-methylol or N-alkoxymethylol are types which react by heating alone, while the functional groups such as carboxyl, hydroxyl, amino or amido are types which react with a cross-linking agent such, for example, as a melamine-formaldehyde resin. The reaction of the foregoing two types of thermosetting vinyl resin latices is accelerate by an acid catalyst. As examples of such curing accelerators, included are such compounds as paratoluenesulfonic acid and ammonium chloride.

It thus becomes possible by the use of the dially phthalate latex of superior stability obtained by the invention process to provide, say, a thermosetting vinyl type resin/diallyl phthalate resin-containing stable latex containing the diallyl phthalate latex obtained by the invention process in an amount of 10 – 70 parts by weight, calculated as weight of monomer used in the preparation of said latex per 100 parts by weight of the thermosetting vinyl type resin portion (denoting the vinyl type resinous solids portion) and, if desired, a cross-linking agent for said thermosetting vinyl type resin in an amount of about 10% to about 50% by weight based on said resin, and/or a radical initiator for accelerating the cure of diallyl phthalate in an amount of about 1% to about 10% by weight based on said monomer weight.

As specific examples of the foregoing cross-linking agents, there can be mentioned the melamine-formaldehyde resins such as methylolated melamine, methylated methylolmelamine and butylated methylolmelamine; the guanamine-formaldehyde resins such as methylolated benzoguanamine and butylated methylol benzoguanamine; the urea-formaldehyde resins such as methylolated urea, methylated methylolurea and butylated methylolurea; the epoxy resins such as bisphenol A-epichlorohydrin, novolak-epichlorohydrin and glycerol triglycidylether, epoxidized polyolefins, epoxidized soybean oil, cyclohexene oxide and glycidyl phthalate; and the metal oxides such as CaO, ZnO and $ZrO_2$. On the other hand, as specific examples of the foregoing radical initiators, included are such as benzoyl peroxide, t-butyl perbenzoate and t-butyl perpivalate. When these radical initiators are used, it becomes possible to use the unsaturated polyester resins as cross-linking agents in addition to the cross-linking agents given above. Again, if desired, an emulsion stabilizer can also be added to the foregoing theremosetting vinyl type resin/diallyl phthalate resin-containing latex.

As the emulsion stabilizers there can be named as specific examples the nonionic surfactants such as the polyoxyethylene alkyl ethers and polyoxyethylene alkyl phenyl ethers; and the water-soluble high molecular weight protective colloids such as polyvinyl alcohol, hydroxyethyl cellulose, methyl cellulose, carboxymethyl cellulose, sodium polyacrylate, polyacrylamide, casein and water-soluble starch. The use of these emulsion stabilizers in an amount of the order of 0.1 – 5 weight % of the foregoing latex containing the two resins will suffice.

The diallyl phthalate latex or the above-described resinous latex mixture containing the vinyl type resin component can also contain, if desired, such other additives as the inorganic pigments as titanium dioxide, lithopone, carbon black, iron black, red oxide, ochre, chromium oxide, ultramarine and aluminum powder; the colorants such as the organic pigments as Permanent Red, Hansa Yellow, Phthalocyaine Green and Phthalocyanine Blue; the pigment dispersants such as the formaldehyde condensation product of sodium alkylnaphthalenesulfonate, the low molecular weight ammonium polyacrylate and the low molecular weight styrene-ammonium maleate copolymer; the wetting agents such as polyoxyethylene fatty acid esters, polyoxyethylene alkyl phenyl ethers, sulfosuccinic acid derivatives and polyoxypropylene-polyoxyethylene ether; the defoaming agents such as n-octyl alcohol, tributyl phosphate, pine oil, and silicone defoamers; the thickeners such as polyvinyl alcohol, methyl cellulose and hydroxyethyl cellulose; the anti-freeze agents such as ethylene glycol and diethylene glycol; the film-forming assistants such as carbitol, carbitol acetate, butyl Cellosolve and butyl Cellosolve acetate; antifungal agents such as mercury compounds, tin compounds, copper compounds, phenolic compounds, sulfur compounds and invert soap; and the fillers such as calcium carbonate, clay, talc, barite and mica. These additives can be added up to such amounts as do not have an adverse effect on the stability of the diallyl phthalate latex of this invention.

In adding these additives, those which are hydrophilic are preferably added after mixing and dissolving them in water, while those which are hydrophobic are preferably added after emulsification. Further, the pigments and fillers are best added as an aqueous suspension.

The diallyl phthalate latex of the present invention can be used with paper, textile materials, knit and woven fabrics, unwoven fabrics, boards, sheet metals and various other substrates by coating or impregnating these materials with the latex and thereafter curing the latex by heating or hot-pressing. On the other hand, in the case of a latex mixture with a vinyl type resin, such as hereinbefore described, the resin can be separated from the latex and rendered into a resinous powder and also be used as a molding material.

The following examples and control experiments will serve to more fully illustrate several modes of the invention diallyl phthalate latex.

EXAMPLE 1

A monomer emulsion was prepared by dissolving 20 grams of an emulsifier (polyoxyethylene nonyl phenyl ether sodium phosphate) in 250 grams of water and then adding 400 grams of diallyl phthalate and stirring the mixture.

This was followed by charging a nitrogen-purged polymerization vessel with 230 grams of water and 134 grams (20 wt. %) of the above monomer emulsion and heating at 80°C. with stirring, after which 100 grams of a 10 wt. % aqueous potassium persulfate solution was added, and the preliminary polymerization reaction was carried out. After the evolution of the heat of polymerization of the preliminary polymerization reaction settled down and the rate of polymerization reached 50 wt. %, the polymerization reaction was furthered while adding 536 grams (80 wt. %) of the remaining monomer emulsion over a period of 3 hours while holding the polymerization temperature at 80°C. The reaction was then continued for a further 4 hours at the same temperature, after which the system was cooled to room temperature.

EXAMPLE 2

A monomer emulsion was prepared by dissolving 20 grams of an emulsifier (polyoxyethylene nonyl phenyl ether sodium phosphate) in 250 grams of water and then adding 400 grams of a monomer mixture (360 grams of diallyl phthalate and 40 grams of butyl acrylate) and stirring the mixture.

This was followed by charging a nitrogen-purged polymerizaton vessel with 290 grams of water and 134 grams (20 wt. %) of the above monomer emulsion and heating at 80°C. with stirring, after which 40 grams of a 10 wt. % aqueous potassium persulfate solution was added, and the preliminary polymerization reaction was carried out. After the evolution of the heat of polymerizaton settled down and the rate of polymerization reached 50 wt. %, the polymerization reaction was furthered while adding 536 grams (80 wt. %) of the remaining monomer emulsion over a period of one hour while holding the polymerization temperature at 80°C. The reaction was then continued for a further 4 hours at the same temperature, after which the system was cooled to room temperature.

EXAMPLE 3

A monomer emulsion was prepared by dissolving 18 grams of an emulsifier (polyoxyethylene nonyl phenyl ether ammonium sulfate) in 250 grams of water and then adding 400 grams of a monomer mixture (360 grams of diallyl phthalate and 40 grams of 2-ethylhexyl acrylate) and stirring the mixture.

This was followed by charging a nitrogen-purged polymerization vessel with 282 grams of water and 134 grams (20 wt. %) of the foregoing monomer emulsion and heating the mixture at 90°C. with stirring. Fifty grams of a 10 wt. % aqueous sodium persulfate solution was then added, and the preliminary polymerization reaction was carried out. After the evolution of the heat of polymerization settled down and the rate of polymerization reached 50 wt. %, the polymerization reaction was furthered while adding 534 grams (80 wt. %) of the remaining emulsion over a period of one hour while maintaining the polymerization temperature at 90°C. The reaction was then continued for a further 3 hours at the same temperature, after which the system was cooled to room temperature.

EXAMPLE 4

Twelve grams of an emulsifier (polyoxyethylene nonyl phenyl ether sodium phosphate) was dissolved in 250 grams of water, to which solution was added 400 grams of a monomer mixture (300 grams of diallyl phthalate and 100 grams of butyl acrylate) followed by stirring the mixture to obtain a monomer emulsion.

A nitrogen-purged polymerization vessel was then charged with 318 grams of water and 66 grams (10 wt. %) of the foregoing monomer emulsion, and the mixture was heated at 80°C. with stirring, after which 20 grams of a 10 wt. % aqueous ammonium persulfate solution was added, and the preliminary polymerization reaction was carried out. After the evolution of the heat of polymerization ceased and the rate of polymerization reached 60 wt. %, the polymerization reaction was furthered while adding 596 grams (90 wt. %) of the remaining monomer emulsion over a period of 2 hours and maintaining the polymerization temperature at 80°C. The polymerization reaction was the continued then a further 2 hours at the same temperature, after which the system was cooled to room temperature.

EXAMPLE 5

Ten grams of an emulsifier (polyoxyethylene nonyl phenyl ether sodium phosphate) was dissolved in 250 grams of water, to which solution was then added 400 grams of a monomer mixture (240 grams of diallyl isophthalate and 160 grams of ethyl acrylate) to prepare a monomer emulsion.

A nitrogen-purged polymerization vessel was then charged with 330 grams of water and 66 grams (10 wt. %) of the foregoing monomer emulsion, and the mixture was heated at 80°C. with stirring. Ten grams of a 10 wt. % aqueous potassium persulfate solution was then added, and the preliminary polymerization reaction was carried out. After the evolution of the heat of polymerization ceased and the rate of polymerization reached 70 wt. %, the polymerization reaction was furthered while adding 594 grams (90 wt. %) of the remaining emulsion over a period of 1 hour and holding the polymerization temperature at 80°C., after which the polymerization reaction was continued for a further 2 hours at the same temperature followed by cooling the system to room temperature.

EXAMPLE 6

A monomer emulsion was prepared by dissolving 24 grams of an emulsifier (polyoxyethylene nonyl phenyl ether sodium phosphate in 450 grams of water and then adding 400 grams of a monomer mixture (200 grams of diallyl phthalate and 200 grams of butyl acrylate) with stirring.

This was followed by charging a nitrogen-purged polymerization vessel with 439 grams of water and 87 grams (10 wt. %) of the above monomer emulsion and heating the mixture at 70°C. with stirring, after which 20 grams of a 10 wt. % aqueous potassium persulfate solution was added and the preliminary polymerization reaction was carried out. After the evolution of the heat of polymerization of the preliminary polymerization reaction settled down and the rate of polymerization reached 70 wt. %, the polymerization reaction was furthered while adding the remaining monomer emulsion in an amount of 787 grams (90 wt. %) over a period of 4 hours and holding the polymerization temperature at 70°C. The reaction was then continued for a further 4 hours at the same temperature, after which the system was cooled to room temperature.

EXAMPLE 7

Twenty grams of an emulsifier (polyoxyethylene nonyl phenyl ether sodium phosphate) was dissolved in 450 grams of water, to which solution was then added 400 grams of a monomer mixture (100 grams of diallyl phthalate and 300 grams of methyl methacrylate) to prepare a monomer emulsion.

Next, a nitrogen-purged polymerization vessel was charged with 443 grams of water and 87 grams (10 wt. %) of the foregoing monomer emulsion, and the mixture was heated at 70°C. with stirring. Twenty grams of a 10 wt. % aqueous potassium persulfate solution was then added, and the preliminary polymerization reaction was carried out. After the evolution of the heat of polymerization ceased and the rate of polymerization reached 80 wt. %, the polymerization reaction was furthered while adding 783 grams (90 wt. %) of the remaining monomer emulsion over a period of 4 hours and maintaining the polymerization temperature at 70°C. The polymerization was then carried out for a further 4 hours at the same temperature, after which the system was cooled to room temperature.

EXAMPLE 8

The polymerization treatment was carried out as in Example 6, except that a monomer mixture consisting of 200 grams of diallyl phthalate, 100 grams of butyl acrylate and 100 grams of styrene was used.

EXAMPLE 9

Example 7 was repeated but using as the monomer mixture that consisting of 100 grams of diallyl phthalate, 200 grams of methyl methacrylate and 100 grams of styrene.

Control 1

This experiment illustrates the instance of the emulsion addition method which comprises using a anion surfactant derived from a nonionic surfactant and carrying out the method by mixing a polymerization initiator in the monomer emulsion.

The polymerization treatment was carried out exactly as in Example 4, except that the polymerization initiator was admixed in advance with the monomer emulsion.

Control 2

This experiment illustrates the instance where a commercial anionic surfactant was used and the polymerization was carried out by the emulsion addition method.

The polymerization treatment was carried out exactly as in Example 4 but using sodium lauryl sulfate as the emulsifier.

Control 3

This experiment illustrates the instance where a nonionic surfactant was used and the polymerization was carried out by the emulsion method.

The experiment was operated exactly as in Example 4, except that polyoxyethylene nonyl phenyl ether was used as the emulsifier.

Control 4

This experiment illustrates the instance where the same composition as that of Example 4 was used, but the monomer addition method was employed.

A nitrogen-purged polymerization vessel was charged with 568 grams of water, 12 grams of polyoxyethylene nonyl phenyl ether sodium phosphate and 40 grams (10 wt. %) of a monomer mixture to 300 grams of diallyl phthalate and 100 grams of butyl acrylate, and the mixture was heated at 80°C. with stirring, following which 20 grams of a 10 wt. % aqueous ammonium persulfate solution was added and the preliminary polymerization reaction was carried out. The polymerization reaction was then furthered while adding the remaining monomer the amount of which was 360 grams (90 wt. %) over a period of 2 hours and holding the temperature at 80°C., after which the reaction was continued for a further 2 hours at the same temperature followed by cooling the system to room temperature.

Control 5

This experiment illustrates the instance where the same composition as that of Example 4 was used, but the one-time charging method was used.

A polymerization vessel, after having been purged with nitrogen, was charged with 568 grams of water, 12 grams of polyoxyethylene nonyl phenyl ether sodium phosphate and 400 grams of a monomer mixture of 300 grams of diallyl phthalate and 100 grams of butyl acrylate, and the mixture was heated at 80°C. with stirring. The polymerization reaction was initiated by adding 20 grams of a 10 wt. % aqueous ammonium persulfate solution, after which the reaction was continued for 4 hours at a polymerization temperature of 80°C. followd by cooling the system to room temperature.

Control 6

This experiment illustrates the instance where the same composition as that of Example 6 was used, but the monomer addition method was employed.

To a polymerization vessel purged with nitrogen were charged 889 grams of water, 24 grams of polyoxyethylene nonyl phenyl ether sodium phosphate and 40 grams (10 wt. %) of a monomer mixture of 200 grams of diallyl phthalate and 200 grams of butyl acrylate, and the mixture was heated at 70°C. with stirring. The preliminary polymerization reaction was then carried out by adding 20 grams of a 10 wt. % aqueous potassium persulfate solution. The polymerization reaction was then furthered while adding the remaining monomer the amount of which was 360 grams (90 wt. %) over a period of 4 hours and maintaining the polymerization temperature at 70°C., after which the reaction was continued for a further 4 hours at the same temperature followed by cooling the system to room temperature.

Control 7

This experiment illustrates the instance of the emulsion addition method wherein the operation is carried out with the polymerization initiator incorporated in the monomer emulsion.

The polymerization treatment was carried out exactly as in Example 7, except that the polymerization initiator was admixed in advance in the monomer emulsion.

EXAMPLES OF PREPARATION OF VINYL RESIN LATICES

Water and emulsifiers indicated in Table 1, below, were charged to a flask and, after having purged the inside of the flask with nitrogen, the catalyst was added with stirring after raising the temperature up to 80°C. A monomer mixture indicated in said table was then slowly added to the foregoing system over a period of 3 hours, after which the polymerization reaction was continued for a further 3 hours with stirring to complete the reaction. The polymerization temperature was maintained at 80±2°C. during this time.

In Table 1, the abbreviations have the following meanings:

| | | | |
|---|---|---|---|
| MMA: | methyl methacrylate | MAA: | methacrylic acid |
| EA: | ethyl acrylate | AM: | acrylamide |
| BA: | butyl acrylate | AA: | acrylic acid |
| VAc: | vinyl acetate | HEA: | 2-hydroxyethylacrylate |
| St: | styrene | SLS: | sodium lauryl sulfate |
| AN: | acrylonitrile | POENPE: | polyoxyethylene nonyl phenyl ether |
| GMA: | glycidyl methacrylate | | |
| MAM: | N-methylolacrylamide | | |
| KPS: | potassium persulfate | | |
| Mo: | monomer | | |

Table 1

| | Preparation Example | | | | | | | | | |
|---|---|---|---|---|---|---|---|---|---|---|
| | 1 | 2 | 3 | 4 | 5 | 6 | 7 | 8 | 9 | 10 |
| Mo Composition | MMA /EA/GMA | MMA /BA/MAM | VAc /EA/MAA | St/BA/AM | EA/AN /AA/HEA | MMA/EA | MMA/BA | VAc/EA | St/BA | EA/AN |
| Mo Composition ratio (wt) | 50/47/3 | 70/27/3 | 50/45/5 | 50/40/10 | 90/4/3/3 | 50/50 | 70/30 | 50/50 | 50/50 | 90/10 |
| Mo name | | | | | | | | | | |
| MMA | 250 | 350 | | | | 250 | 350 | | | |
| EA | 235 | | 225 | | 450 | 250 | | 250 | | 450 |
| BA | | 135 | | 200 | | | 150 | | 250 | |
| Vac | | | 250 | | | | | 250 | | |
| St | | | | 250 | | | | | 250 | |
| AN | | | | | 20 | | | | | 50 |
| GMA | 15 | | | | | | | | | |
| MAM | | 15 | | | | | | | | |
| MAA | | | 25 | | | | | | | |
| AM | | | | 50 | | | | | | |
| Viscosity (CPS) | 460 | 485 | 548 | 320 | 383 | 410 | 428 | 450 | 290 | 345 |
| pH | 6.7 | 6.6 | 2.7 | 6.3 | 2.6 | 6.8 | 6.7 | 6.5 | 6.6 | 6.8 |

| | Preparation Example | | | | | | | | | |
|---|---|---|---|---|---|---|---|---|---|---|
| | 1 | 2 | 3 | 4 | 5 | 6 | 7 | 8 | 9 | 10 |
| Mo Composition | MMA /EA/GMA | MMA /BA/MAM | VAc /EA/MAA | St/BA/AM | EA/AN /AA/HEA | MMA/BA | MMA/BA | VAc/EA | St/BA | EA/AN |
| Name | | | | | | | | | | |
| AA | | | | | 15 | | | | | |
| HEA | | | | | 15 | | | | | |
| Emulsifier | | | | | | | | | | |
| SLS | 4 | 4 | 2 | 2 | 5 | 4 | 4 | 2 | 2 | 5 |
| POENPE | 4 | 4 | 6 | 6 | 3 | 4 | 4 | 6 | 6 | 3 |
| Catalyst | | | | | | | | | | |
| KPS | 2 | 2 | 2 | 2 | 2 | 2 | 2 | 2 | 2 | 2 |
| Water | | | | | | | | | | |
| Deionized water | 490 | 490 | 490 | 490 | 490 | 490 | 490 | 490 | 490 | 490 |
| Solids content (wt %) | 51 | 51 | 51 | 51 | 51 | 51 | 51 | 51 | 51 | 51 |

Tests Results.

The latices formed in Examples 1 – 7 and Controls 1 – 7 were tested for their amounts of coagulum formation, rates of polymerization, solids contents, viscosities, pHs, mechanical stabilities, chemical stabilities, stabilities to freezing and stabilities when left standing. The results obtained are shown in Table 2.

Items Tested and Test Methods.

1. Amount of coagulum formed. The resulting latex is filtrably separated with an 80-mesh stainless steel screen, water-washed and dried by heating for 3 hours at 110°C. The weight of the resulting dried material to the weight of monomer charged is expressed in percentage.

2. Rate of polymerization. About one gram of the specimen latex is accurately weighed out. Thirty milliliters of methanol is added thereto and mixed with thorough shaking. A few drops of a 5% aqueous alum solution is then added to coagulate the polymer. The system is then placed in a centrifugal sedimentation vessel, and the polymer is precipitated by operating the machine for 5 minutes at 2000 rpm, after which the supernatant liquid is removed by decantation. The precipitate is dried by heating for 3 hours at 110°C. The weight of the resulting dried precipitate to the weight of monomer charged is expressed in percentage.

3. Solids content. About one gram of the specimen latex is accurately weighed out and dried for 3 hours at 110°C. The weight of the dried material to the latex is expressed in percentage.

4. Viscosity. The specimen latex is measured at 30°C. with a Model B viscosimeter.

5. pH. The specimen latex is measured for its pH at 30°C. with a pH meter.

6. Mechanical stability. The Maron's testing machine for mechanical stability is employed. A precipitate formed in 5 minutes from 50 grams of the specimen latex under the conditions of 10 kg/cm² and 1000 rpm is filtrably separated with an 80-mesh stainless steel screen, water-washed and dried by heating for 3 hours at 110°C. The weight of the resulting dried material to that of the monomer charged is expressed as percentage.

7. Chemical stability. Ten milliliters of aqueous $CaCl_2$ solutions of different concentrations are added to 10 milliliters of the latex specimen with stirring. The concentration of the $CaCl_2$ at which precipitation of polymer takes place is expressed in moles per liter.

8. Stability to freezing. Ten milliliters of the specimen latex is placed in a test tube and frozen for 16 hours at −15°C. After allowing the latex to thaw, its state is judged with the naked eye, and a 3-stage qualitative rating of O, Δ or X is assigned respectively in accordance with whether the latex is unchanged, a precipitate is separated out or the latex is destroyed.

9. Stability when left standing. The specimen latex is stored for one month at room temperature in a sealed container. The latex is then examined for its state and assigned one of the ratings of a 3-stage qualitative rating of O, Δ or X respectively in accordance with whether the latex is unchanged, separated or there is a separation of a precipitate.

10. Mixing stability

10.1 Miscibility with vinyl resin latex. Ten milliliters of the latex obtained in Preparation Example 1 is added to 10 milliliters of the specimen latex with stirring. The state of the latex mixture is then judged with the naked eye and assigned one of the ratings of a 3-stage qualitative rating of O, Δ or X respectively in accordance with whether the latex is unchanged, separated or there is a separation of a precipitate.

10.2 Miscibility with No. 3 water glass. Ten milliliters of No. 3 water glass is added to 10 milliliters of the specimen latex with stirring, after which the state of the latex is immediately judged with the naked eye and assigned one of the ratings of a 3-stage qualitative rating of O, Δ or X repsectively in accordance with whether the latex is unchanged, separated or there is a separation of a precipitate.

Table 2-(1)

| | Example | | | | | | | | |
|---|---|---|---|---|---|---|---|---|---|
| | 1 | 2 | 3 | 4 | 5 | 6 | 7 | 8 | 9 |
| Monomer composition name | DAP | DAP/BA | DATP/EHA | DAP/BA | DAIP/EA | DAP/BA | DAP/MMA | DAP/BA/St | DAP/MMA/St |
| Monomer composition ratio (wt/wt.) | 100 | 90/10 | 90/10 | 75/25 | 60/40 | 50/50 | 25/75 | 50/25/25 | 25/50/25 |
| Monomer concentration (wt%) | 40 | 40 | 40 | 40 | 40 | 30 | 30 | 30 | 30 |
| Class of emulsifier | N·A | N·A | N·A | N·A | N·A | N·A | N·A | N·A | N·A |
| Emulsion polymerization method | Em | Em | Em | Em | Em | Em | Em | Em | Em |
| 1. Amount of coagulum formed (wt %) | 0.8 | 0.6 | 0.6 | 0.6 | 0.6 | 0.5 | 0.5 | 0.5 | 0.5 |
| 2. Rate of polymerization (wt %) | 60.2 | 59.8 | 65.1 | 70.3 | 71.0 | 98.6 | 99.8 | 98.7 | 99.9 |
| 3. Solids content (wt %) | 43.0 | 42.4 | 42.3 | 41.4 | 41.1 | 31.9 | 31.6 | 31.9 | 31.6 |
| 4. Viscosity (CPS) | 162 | 270 | 350 | 120 | 216 | 38.8 | 46.2 | 41.5 | 49.3 |
| 5. pH | 6.2 | 6.5 | 6.7 | 6.7 | 6.6 | 6.8 | 6.8 | 6.8 | 6.8 |
| 6. Mechanical stability (wt%) | 0.25 | 0.23 | 0.27 | 0.21 | 0.17 | 0.10 | 0.11 | 0.10 | 0.10 |
| 7. Chemical stability (mol/l) | 0.5 | 1.0 | 1.0 | 1.0 | 1.0 | 1.5 | 1.5 | 1.5 | 1.5 |
| 8. Stability to freezing | O | O | O | O | O | O | O | O | O |
| 9. Stability when left standing | O | O | O | O | O | O | O | O | O |
| 10. Mixing stability | | | | | | | | | |
| 10-1. Vinyl resin | O | O | O | O | O | O | O | O | O |
| 10-2. Water Glass | — | — | — | — | — | O | O | O | O |

Table 2-(2)

|   |   | Control | | | | | | |
|---|---|---|---|---|---|---|---|---|
|   |   | 1 | 2 | 3 | 4 | 5 | 6 | 7 |
| Monomer composition name | | DAP/BA | DAP/BA | DAP/BA | DAP/BA | DAP/BA | DAP/BA | DAP/MMA |
| Monomer composition ratio (wt./wt.) | | 75/25 | 75/25 | 75/25 | 75/25 | 75/25 | 50/50 | 25/75 |
| Monomer concentration (wt%) | | 40 | 40 | 40 | 40 | 40 | 30 | 30 |
| Class of emulsifier | | N·A | A | N | N·A | N·A | N·A | N·A |
| Emulsion polimerization method | | Em-Cat | Em | Em | Mo | Bulk | Mo | Em-Cat |
| 1. | Amount of coagulum formed (wt %) | 6.5 | 13.4 | 19.5 | 7.3 | 8.6 | 5.3 | 5.9 |
| 2. | Rate of polymerization (wt %) | 69.5 | 72.4 | 68.7 | 71.7 | 69.3 | 98.3 | 99.7 |
| 3. | Solids content (wt %) | 41.4 | 41.4 | 41.4 | 41.4 | 41.4 | 31.9 | 31.6 |
| 4. | Viscosity (CPS) | 115 | 381 | 62.7 | 334 | 277 | 82.3 | 47.0 |
| 5. | pH | 6.6 | 6.5 | 6.6 | 6.3 | 6.1 | 6.6 | 6.7 |
| 6. | Mechanical stability (wt %) | 1.36 | 1.61 | 1.05 | 3.28 | 3.76 | 0.95 | 0.89 |
| 7. | Chemical stability (mol/l) | 0.1 | 0.1 | 0.1 | 0.1 | 0.1 | 0.2 | 0.2 |
| 8. | Stability to freezing | X | X | X | X | X | Δ | Δ |
| 9. | Stability when left standing | Δ | Δ | Δ | Δ | Δ | Δ | Δ |
| 10. | Mixing stability | | | | | | | |
| 10-1. | Vinyl resin | X | X | X | X | Δ | Δ | Δ |
| 10-2. | Water glass | — | — | — | — | — | X | X |

Note:-
In Table 2 the dash "—" indicates that the test was not performed.
The following abbreviations have the following meanings:
DAP: diallyl phthalate, DATP: diallyl terephthalate, DAIP: diallyl isophthalate, BA: butyl acrylate, EHA: 2-ethylhexyl acrylate, EA: ethyl acrylate, MMA: methyl methacrylate, St: styrene, N·A: nonionic anion surfactant, A: anionic surfactant, N: nonionic surfactant, EM: emulsion addition method, Em-Cat: emulsion addition method in which catalyst is admixed with the monomer emulsion, Mo: monomer addition method, Bulk: method of charging at once.

APPLICATION EXAMPLE 1

Latex mixtures prepared by mixing in the proportions shown in Table 3, below, the DAP resin latices obtained in Examples 1 – 9 and the vinyl resin latex obtained in Preparation Example 2, as shown in Table 1, were used, and the heat resistances, glosses and adhesivenesses of their films were tested with the results shown in Table 3, below.

Test Methods and Evaluation of Results.

1. Heat resistance. The several specimen latices are applied to a high grade paper of a basis weight of 70 g/m$^2$ such that the amount applied becomes 10 g/m$^2$, using a wire rod, followed by drying with hot air for 2 minutes at 140°C. The coated surfaces of the paper are then brought together and heat sealed with a heat sealing machine under the conditions of a pressure of 1 kg/cm$^2$ and a sealing time of 5 seconds, the critical temperature at which blocking occurs being observed. The following ratings are then assigned.

◎ Blocking occurs above 160°C.
O Blocking occurs from 110°C. to less than 160°C.
Δ Blocking occurs from 60°C. to less than 110°C.
X Blocking occurs at less than 60°C.

2. Gloss. The several specimen latices are admixed homogenously with TiO$_2$(R) such that the pigment volume concentration becomes 15%. The several latices are then coated and dried as in the foregoing heat resistance test and thereafter measured for their 60 deg specular gloss and rated as follows:

◎ Those above 92%.
O Those from 80% to less than 92%.
Δ Those from 60% to less than 80%.
X Those less than 60%.

3. Adhesiveness. A nylon sheet is adhered to a vinyl chloride sheet using the several specimen latices, after which the latices bonding the sheets are dried by heating the adhered sheet assembly for 30 minutes at 100°C. A 90 deg peeling test is then conducted, using test pieces of 30-mm width. The adhesiveness is calculated as follows:

$$\text{Adhesiveness (kg/30 mm)} = \frac{\text{Force required for rupturing the adhesion (kg)}}{\text{Width of the test piece (mm)}}$$

The results are then rated as follows:

◎ Those of adhesiveness above 6 kg/30 mm.
O Those of adhesiveness from 4 to less than 6 kg/30 mm.
Δ Those of adhesiveness from 2 to less than 4 kg/30 mm.
X Those of adhesiveness less than 2 kg/30 mm.

Table 3

| | Application Experiment | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| DAP resin latex | | | | | | | | | | | | | | | | |
| DAP 100 | 15 g | | | | | | | | | | | | | | | |
| DAP/BA 90/10 | | 15 g | | | | | | | | | | | | | | |
| DATP/EHA 90/10 | | | 15 g | | | | | | | | | | | | | |
| DAP/BA 75/25 | | | | 15 g | | | | | | | | | | | | 100 g |
| DAIP/EA 60/40 | | | | | 30 g | | | | | | | | | | | 100 g |

Table 3-continued

| | Application Experiment | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| DAP/BA 50/50 | | | | | | 30 g | | | | | | | | 100 g | | |
| DAP/MMA 25/75 | | | | | | | | 40 g | | | | | 100 g | | | |
| DAP/BA/St 50/25/25 | | | | | | | | | 40 g | | | 100 g | | | | |
| DAP/MMA/St 25/50/25 | | | | | | | | | | 40 g | 100 g | | | | | |
| Vinyl resin latex | | | | | | | | | | | | | | | | |
| MMA/BA/MAM 70/27/3 | 85 g | 85 g | 85 g | 85 g | 70 g | 70 g | 60 g | 60 g | 60 g | 100 g | | | | | | |
| Content in latex mixture of | | | | | | | | | | | | | | | | |
| DAP resin (wt %) | 12.4 | 12.4 | 12.4 | 12.4 | 25.5 | 25.5 | 34.8 | 34.8 | 34.8 | 0 | 100 | 100 | 100 | 100 | 100 | 100 |
| Vinyl resin (wt %) | 87.6 | 87.6 | 87.6 | 87.6 | 74.5 | 74.5 | 65.2 | 65.2 | 65.2 | 100 | 0 | 0 | 0 | 0 | 0 | 0 |
| Heat resistance | ◎ | ◎ | ◎ | ◎ | ◎ | ◎ | ◎ | ◎ | ◎ | X | | | | | | |
| Gloss | ◎ | ◎ | ◎ | ◎ | ◎ | ◎ | ◎ | ◎ | ◎ | Δ | | | | | | |
| Adhesiveness | ◎ | ◎ | ◎ | ◎ | ◎ | ◎ | ◎ | ◎ | ◎ | Δ | | | | | | |

APPLICATION EXAMPLE 2

Latex mixtures prepared by mixing in the proportions shown in Table 4 the DAP resin latex obtained in Example 4 and the vinyl resin latices obtained in Preparation Examples 1 – 10, as shown in Table 1, were used, and the heat resistances, glosses and adhesivenesses of their films were tested with the results shown in Table 4.

The test methods and the evaluation of the results were carried out as in Application Example 1.

APPLICATION EXAMPLE 3

As shown in Table 5, impregnants were prepared by mixing a 50% aqueous melamine resin solution and a t-butyl perbenzoate catalyst with latex mixtures obtained by blending DAP resin latices obtained in Examples 1 – 3 with the vinyl resin latex obtained in Preparation Example 3.

Paper (× ×30 cm) of a basis weight of 80 g/m² printed with a wood-grain pattern was impregnated with the several impregnants by dipping therein followed by air drying at 50°C. and precuring at 65°C. for Table 4

| | Application Experiments | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| DAP resin latex | | | | | | | | | | | | | | | | |
| DAP/BA 75/25 | 15 g | 15 g | 15 g | 15 g | 15 g | 50 g | 50 g | 50 g | 50 g | 50 g | 50 g | 50 g | 50 g | | | |
| Vinyl resin latex | | | | | | | | | | | | | | | | |
| MMA/EA/GMA 50/47/3 | 85 g | | | | | | | | | | | | | | | |
| MMA/BA/MAM 70/27/3 | | 85 g | | | | | | | | | | | | | | |
| VAc/EA/MAA 50/45/5 | | | 85 g | | | | | | | | | | | | | |
| St/BA/AM 50/40/10 | | | | 85 g | | | | | | | | | | | | |
| EA/AN/AA/HEA 90/4/3/3 | | | | | 85 g | | | | | | | | | | | |
| MMA/EA 50/50 | | | | | | 50 g | | | | | | | | | | |
| MMA/BA 70/30 | | | | | | | 50 g | | | | | | | | | |
| VAc/EA 50/50 | | | | | | | | 50 g | | | | | | | | |
| St/BA 50/50 | | | | | | | | | 50 g | | | | | | | |
| EA/AN 90/10 | | | | | | | | | | 50 g | | | | | | |
| Et/VAc* | | | | | | | | | | | 50 g | | | | | 100 g |
| PVC** | | | | | | | | | | | | 50 g | | | 100 g | |
| St/Bu*** | | | | | | | | | | | | | 50 g | 100 g | | |
| Content in latex mixture of | | | | | | | | | | | | | | | | |
| DAP resin (wt %) | 12.4 | 12.4 | 12.4 | 12.4 | 12.4 | 44.4 | 44.4 | 44.4 | 44.4 | 44.4 | 42.1 | 47.0 | 44.9 | 0 | 0 | 0 |
| Vinyl resin (wt %) | 87.6 | 87.6 | 87.6 | 87.6 | 87.6 | 55.6 | 55.6 | 55.6 | 55.6 | 55.6 | 57.9 | 53.0 | 55.1 | 100 | 100 | 100 |
| Heat resistance | ◎ | ◎ | ◎ | ◎ | ◎ | Δ | Δ | Δ | Δ | Δ | Δ | O | X | X | Δ | X |
| Gloss | ◎ | ◎ | ◎ | ◎ | ◎ | ◎ | ◎ | ◎ | ◎ | ◎ | ◎ | ◎ | O | Δ | Δ | Δ |
| Adhesiveness | ◎ | ◎ | ◎ | ◎ | ◎ | ◎ | ◎ | ◎ | ◎ | ◎ | ◎ | ◎ | ◎ | X | X | X |

*Ethylene-vinyl acetate: SUMIKAFLEX 100 HS, product of Sumitomo Chemical Co., Ltd., solids content 55 %.
**Polyvinyl chloride: VINIBRAN 200 C, product of Nisshin Chemical Co., Ltd., solids content 45 %.
***Styrene-butadiene: NIPOL LX 407, product of Nippon Zeon Co., Ltd., solids content 49 %.

5 minutes to prepare the several impregnated papers whose rate of impregnant adhesion was about 100%.

The so obtained several impregnated papers were then overlaid on 3-mm-thick plywoods and pressed with a flat press suspended with a polished surface, under the conditions of 140°C., 15 kg/cm² and 10 minutes, to prepare the several decorative plywoods.

The so obtained decorative plywoods were then tested by the procedures for testing specially processed decorative plywood of the Japanese Agricultural Standards. The results obtained are shown in Table 5.

Test Methods and Evaluation of Results. 1. Peeling on immersion. A test piece of a dimension 75 × 75 mm is dipped for 2 hours in boiling water, 70°C. water or 35°C. water and then dried for 3 hours at 60°C. To pass the test, the portion not peeling must be at least 50 mm. The ratings are assigned as follows:

◎ Those passing the boiling water test.
○ Those which fail in the boiling water test but pass the 60°C. water test.
△ Those which fail in the 60°C. water test but pass the 35°C. water test.
X Those failing the 35°C. water test.

2. Hot-cold repetition. A test piece of a dimension 150 × 150 mm is left to stand for 2 hours at 80°C., 60°C. or 40°C. and thereafter left to stand for 2 hours at −20°C. This operation is repeated twice. The requirement is that there are no changes in the piece such as cracking, swelling, wrinkling and discoloration of the decorative surface. The rating are assigned as follows:

◎ Those exhibiting no change at 80°C.
○ Those exhibiting changes at 80°C. but not at 60°C.
△ Those exhibiting changes at 60°C. but not at 40°C.
X Those exhibiting changes at 40°C.

3. Water resistance. Two sheets of test pieces 150 × 150 mm in size are adhered back-to-back with room temperature-adhesive phenolic resin, and the edges are also covered. This assembly is dipped for one hour in hot water of 80°C., 60°C. or 40°C. and then dried for 2 hours at 60°C. The requirement is that no changes such as cracking, swelling, peeling, discoloration and loss of gloss take place in the decorative surfaces. The ratings are assigned as follows:

◎ Those exhibiting no change in 80°C. hot water.
○ Those exhibiting changes in 80°C. hot water but not in 60°C. hot water.
△ Those exhibiting changes in 60°C. hot water but not in 40°C. hot water.
X Those exhibiting changes in 40°C. hot water.

4. Abrasion. Three disks of 120-mm diameter are cut out from the decorative sheets, and a hole is drilled in the center of each of the disks. The test is carried out as prescribed using these disks as test piece and with a load of 500 grams. The number of rotations is read when the abrasion end point is reached, and the abrasion value and amount of abrasion are obtained as follows:

$$\text{Abrasion value} = \frac{\text{Sum of the number of rotations of the several test pieces}}{3}$$

$$\text{Amount of abrasion } (g) = \frac{W}{C} \times 100$$

where W is the average weight loss of the three test pieces, and C is the abasion value. The ratings are then assigned as follows:

◎ Those of abrasion value above 100 and amount of abrasion less than 0.1 gram.
○ Those of abrasion value from 50 to less than 100 amount of abrasion less than 0.1 gram.
△ Those of abrasion value from 25 to less than 50 and amount of abrasion less than 0.1 gram.
X Those of abrasion value less than 25 and amount of abrasion less than 0.1 gram.

5. Scratching hardness. A diamond needle is used, and three scratches of 50-mm length are made in a test piece of a dimension of 90 × 170 mm with loads of 200, 100 and 50 grams. The average depth of the scratches must be not more than 10 microns. The ratings are then assigned as follows:

◎ Those in which the scratches are less than 10 microns with a load of 200 grams.
○ Those in which the scratches are 10 microns or more with a load of 200 grams but less than 10 microns with a 100-gram load.
△ Those in which the scratches are 10 microns or more with a load of 100 grams but less than 10 microns with a 50-gram load.
X Those in which the scratches are 10 microns or more with a 50-gram load.

6. Impact strength. A falling ball having a distal portion curvature radius of 25.4 mm and of 150, 100 or 50 grams is dropped 50 times with the distance of fall being 30 mm. No changes such as cracks or peeling must take place in the decorative surface. The ratings are then assigned as follows:

◎ Those exhibiting no change with the 150-gram load.
○ Those exhibiting changes with the 150-gram load but no change with the 100-gram load.
△ Those exhibiting changes with the 100-gram load but no change with the 50-gram load.
X Those exibiting changes with the 50-gram load.

Table 5

| | \multicolumn{16}{c}{Application Experiments} | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| DAP resin latex | | | | | | | | | | | | | | | | |
| DAP 100 | 500g | | | 700g | | | 900g | | | 300g | | | 500g | | | |
| DAP/BA 90/10 | | 500g | | | 700g | | | 900g | | | 300g | | | 500g | 500g | |
| DATP/EHA 90/10 | | | 500g | | | 700g | | | 900g | | | 300g | | | 500g | |
| Vinyl resin latex | | | | | | | | | | | | | | | | |
| VAc/EA/MAA 50/45/5 | 400g | 400g | 400g | 200g | 200g | 200g | | | | 600g | 600g | 600g | 300g | 450g | 500g | 900g |
| Content in latex mixture of | | | | | | | | | | | | | | | | |
| DAP resin (wt %) | 50 | 50 | 50 | 73.7 | 73.7 | 73.7 | 100 | 100 | 100 | 28.6 | 28.6 | 28.6 | 57.1 | 47.0 | 44.4 | 0 |
| Vinyl resin | 50 | 50 | 50 | 26.3 | 26.3 | 26.3 | 0 | 0 | 0 | 71.4 | 71.4 | 71.4 | 42.9 | 53.0 | 55.6 | 100 |

Table 5-continued

| | Application Experiments | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| (wt %) | | | | | | | | | | | | | | | | |
| 50% Aq. melamine resin sol.* | 100g | 100g | 100g | 100g | 100g | 100g | 100g | 100g | 100g | 100g | 100g | 100g | 200g | 50g | | 100g |
| Curing catalyst t-butyl perbenzoate | 10g | 10g | 10g | 12g | 12g | 12g | 15g | 15g | 15g | 6g | 6g | 6g | 10g | 10g | 10g | 10g |
| Test items | | | | | | | | | | | | | | | | |
| Peeling on immersion | ⊙ | ⊙ | ⊙ | ⊙ | ⊙ | ⊙ | O | O | O | ⊙ | ⊙ | ⊙ | ⊙ | ⊙ | O | X |
| Hot-cold repetition | ⊚ | ⊚ | ⊚ | ⊚ | ⊚ | ⊚ | O | O | O | ⊚ | ⊙ | ⊙ | ⊙ | O | O | X |
| Water resistance | ⊚ | ⊚ | ⊚ | ⊚ | ⊚ | ⊙ | O | O | O | ⊚ | ⊚ | ⊚ | ⊚ | O | O | O |
| Abrasion | ⊚ | ⊚ | ⊚ | ⊚ | ⊚ | ⊚ | O | O | O | ⊚ | ⊚ | ⊚ | ⊚ | ⊚ | O | X |
| Scratching hardness | O | O | O | O | O | O | O | O | O | O | O | O | O | O | O | X |
| Impact strength | ⊚ | ⊚ | ⊚ | ⊚ | ⊚ | ⊚ | O | O | O | ⊚ | ⊚ | ⊚ | ⊚ | ⊚ | O | O |

*NICARESIN S-260, product of Nippon Carbide Industrial Co., Ltd.

We claim:

1. A process for preparing a diallyl phthalate latex which comprises using in proportions of a total of 30 – 100 weight parts of monomer and a total of 0.3 – 10.0 weight parts of an anionic surfactant derived from a nonionic surfactant to a total of 100 weight parts of water, and (I) carrying out an emulsion polymerization using an emulsion polymerization system containing a mixture of
   a. water in an amount of 50 – 70 weight % of the total amount of water to be used,
   b. monomer in an amount of 10 – 20 weight % of the total amount of monomer to be used, said monomer being selected from the group consisting of a diallyl phthalate monomer and a diallyl phthalate-containing monomeric mixture wherein at least one member is selected from the group consisting of alkyl acrylate having 1–8 carbon atoms, alkyl methacrylate having 1–8 carbon atoms or a mixture thereof contained in a mole ratio to diallyl phthalate of not more than 3:1, and
   c. said surfactant in an amount of 10 – 20 weight % of the total amount of surfactant to be used; and
II. adding at one time the entire amount of a radical catalyst; and then
III. at a period after the degree of polymerization has reached at least 50 weight % and before completion of the polymerization, continuing the emulsion polymerization reaction while adding an additional emulsion polymerization system containing the following components and without said radical catalyst:
   a. water remaining of the total amount to be used,
   b. monomer remaining of the total amount to be used, and
   c. said surfactant remaining of the total amount to be used.

2. The process of claim 1 wherein said emulsion polymerization reaction of (II), is carried out until a rate of polymerization of about 50 – 100 % is reached.

3. The process of claim 1 wherein said emulsion polymerization reactions of (I) and (II), are carried out at temperatures ranging from room temperature to the reflux temperature of the polymerization system.

4. The process of claim 1 wherein said anionic surfactant is selected from the group consisting of the $NH_4$, Na and K salts of sulfuric and phosphoric acid esters of nonionic surfactants of the group consisting of polyoxyethylene alkyl phenyl ethers, polyoxyethylene alkyl ethers and polyoxyethylenepolyoxypropylene ethers.

5. The process of claim 1 wherein said radical catalyst is a compound selected from the group consisting of ammonium persulfate, sodium persulfate, potassium persulfate and hydrogen peroxide.

6. The process of claim 1 wherein said radical catalyst is used in an amount of about 0.05 to about 5% by weight based on the total amount of said monomer.

7. The process of claim 1 wherein up to one-half by weight of said alkyl acrylate and/or alkyl methacrylate is substituted by other vinyl monomers copolymerizable therewith.

* * * * *